United States Patent
De Oliveira Vivi et al.

(10) Patent No.: US 12,135,569 B2
(45) Date of Patent: Nov. 5, 2024

(54) METHODS AND APPARATUS TO REDUCE THERMAL FLUCTUATIONS IN SEMICONDUCTOR PROCESSORS

(71) Applicant: Intel Corporation, Santa Clara, CA (US)

(72) Inventors: Rodrigo De Oliveira Vivi, Hillsboro, OR (US); John Kelbert, Aptos, CA (US); David Lombard, Rossmoor, CA (US); Eric Moret, Beaverton, OR (US); Mark Luckeroth, Portland, OR (US); Brad Bittel, Beaverton, OR (US); Phani Kumar Kandula, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 716 days.

(21) Appl. No.: 17/133,279

(22) Filed: Dec. 23, 2020

(65) Prior Publication Data
US 2021/0223805 A1 Jul. 22, 2021

(51) Int. Cl.
G05D 23/19 (2006.01)
G05B 15/02 (2006.01)
G06F 9/48 (2006.01)
G06F 9/50 (2006.01)

(52) U.S. Cl.
CPC ......... G05D 23/1917 (2013.01); G05B 15/02 (2013.01); G06F 9/4893 (2013.01); G06F 9/5094 (2013.01)

(58) Field of Classification Search
CPC .. G05D 23/1917; G05B 15/02; G06F 9/4893; G06F 9/5093

USPC .......................................................... 700/300
See application file for complete search history.

(56) References Cited

U.S. PATENT DOCUMENTS

| 5,752,011 | A | 5/1998 | Douglass et al. | |
|---|---|---|---|---|
| 7,324,877 | B2 * | 1/2008 | Tanaka | G05D 23/1935 702/99 |
| 7,484,111 | B2 * | 1/2009 | Fung | G06F 1/3203 713/323 |
| 8,449,173 | B1 * | 5/2013 | Strong | G01M 99/002 374/57 |
| 2007/0067136 | A1 * | 3/2007 | Conroy | G06F 1/206 713/300 |

(Continued)

FOREIGN PATENT DOCUMENTS

WO 2023055461 A1 4/2023

OTHER PUBLICATIONS

European Patent Office, "Extended European Search Report," issued in connection with European Patent Application No. 21210860.9, dated May 18, 2022, 7 pages.

(Continued)

*Primary Examiner* — Md Azad
(74) *Attorney, Agent, or Firm* — Hanley, Flight & Zimmerman, LLC

(57) ABSTRACT

Methods, apparatus, systems, and articles of manufacture to reduce thermal fluctuations in semiconductor processors are disclosed. An apparatus includes a temperature analyzer to determine a current temperature of a processor. The apparatus further includes a controller to provide an idle workload to the processor to execute in response to the current temperature falling below a setback temperature.

25 Claims, 7 Drawing Sheets

(56) References Cited

U.S. PATENT DOCUMENTS

| | | | |
|---|---|---|---|
| 2009/0030644 A1* | 1/2009 | Johns | G01K 7/015 |
| | | | 702/130 |
| 2009/0177907 A1* | 7/2009 | Sotomayor, Jr. | G06F 1/3203 |
| | | | 713/340 |
| 2010/0049995 A1 | 2/2010 | Casey et al. | |
| 2012/0166839 A1 | 6/2012 | Sodhi et al. | |
| 2012/0271481 A1* | 10/2012 | Anderson | G06F 1/324 |
| | | | 700/299 |
| 2014/0122917 A1 | 5/2014 | Chung et al. | |
| 2020/0126612 A1 | 4/2020 | Mayer et al. | |
| 2020/0319700 A1 | 10/2020 | Wu et al. | |
| 2023/0101997 A1 | 3/2023 | Kaburlasos et al. | |

OTHER PUBLICATIONS

International Searching Authority, "International Search Report," issued in connection with PCT Patent Application No. PCT/US2022/037450, mailed on Nov. 7, 2022, 3 pages.

International Searching Authority, "Written Opinion," issued in connection with PCT Patent Application No. PCT/US2022/037450, mailed on Nov. 7, 2022, 4 pages.

International Searching Authority, "International Preliminary Report on Patentability," issued in connection with PCT Patent Application No. PCT/US2022/037450, issued on Apr. 2, 2024, 5 pages.

European Patent Office, "Communication Under Rule 71(3) EPC," issued in connection with European Patent Application No. 21210860.9, dated Sep. 9, 2024, 9 pages.

* cited by examiner

METHODS AND APPARATUS TO REDUCE THERMAL FLUCTUATIONS IN SEMICONDUCTOR PROCESSORS

STATEMENT REGARDING FEDERALLY SPONSORED RESEARCH AND DEVELOPMENT

This invention was made with Government support under Agreement Number 8F-30005, awarded by the Department of Energy. The Government has certain rights in this invention.

FIELD OF THE DISCLOSURE

This disclosure relates generally to semiconductor devices, and, more particularly, to methods and apparatus to reduce thermal fluctuations in semiconductor processors.

BACKGROUND

Processors and other semiconductor devices generate heat when they are performing computations and/or other operations. Furthermore, more intensive computational workloads typically correspond to greater increases in heat. Thus, higher performance computing devices typically experience greater thermal stresses which can deleteriously impact the reliability and/or useful life of such devices.

Figure 1:
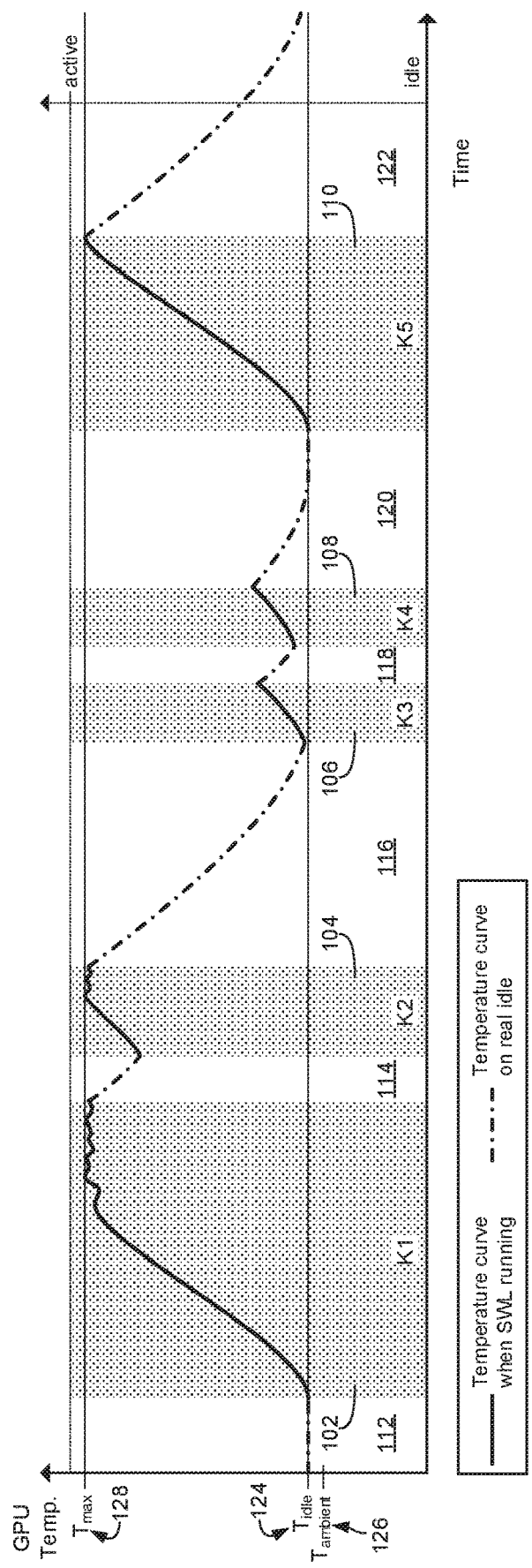
FIG. 1 illustrates an example temperature profile of a processor while executing standard workload including five computational kernels.

The figures are not necessarily to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Many semiconductor-based processors (e.g., central processing units (CPUs), graphics processing units (GPUs), accelerators, etc.) are housed in a ball gird array (BGA) package. In addition to solder joints within the packages (die-die, die-to-package substrate), BGA packages include an array of metallic balls that may be individually connected to a printed circuit board (PCB) via a corresponding array of solder joints. The reliability of such joints over time (e.g., the useful life of such joints) and other integrated circuit package and/or packaging materials can be negatively impacted when exposed to thermal stresses such as relatively frequent fluctuations in temperatures over relatively large temperature ranges. While such thermal fluctuations may occur in any type of processor (whether associated with a BGA package or otherwise), they can have especially significant impacts on processor packages intended for high performance computing applications (e.g., supercomputers and/or data centers). By reducing the thermal fluctuations of an integrated circuit, one can reduce the reliability limiting stress on that integrated circuit and/or its associated package, thereby increasing the reliability lifetime of the processor package.

High performance computing exacerbates the problems associated thermal fluctuation induced stress because high performance processors are typically implemented in larger packages that operate at higher powers to perform more computationally intensive tasks. Such conditions result in greater maximum temperatures (as such packages can produce more heat) and, thus, larger fluctuations in temperatures between when a high performance processor is being used and when it is idle. Furthermore, high performance computing applications often involve relatively frequent changes between active periods when a processor is being run at or near its full capacity (thereby producing large amounts of heat) and idle periods when the processor is not being used (during which the processor may cool off to near ambient temperatures).

As used herein, an active period of a processor is when the processor is in an active state. As used herein, an active state is when the processor is either executing a standard workload (SWL) or the processor is scheduled to execute an SWL. As used herein, an SWL is any workload associated with particular tasks to be completed by the processor as part of its normal or standard operation. Many SWLs are user workloads that are initiated, provided, and/or defined by a user of the associated computing device. However, other SWLs may be implemented automatically to accomplish particular tasks (e.g. maintenance tasks) without specific input from a user. As used herein, an idle period of a processor is when the processor is in an idle state. As used herein, an idle state is when the processor is not executing any SWLs and is not scheduled to execute any SWLs.

Temperature fluctuations in a GPU implementing typical high performance computations for a standard workload (SWL) including five computational kernels (K1 through K5) is shown in FIG. 1. While FIG. 1 is described with reference to a GPU, similar temperature profiles may occur in any other type of processor and teachings disclosed herein may be suitably adapted to such processors. In the illustrated example, the shaded bands 102, 104, 106, 108, 110 represent active periods of the GPU corresponding to the five computational kernels being executed. The periods of time outside and between the active periods 102, 104, 106, 108, 110 correspond to idle periods 112, 114, 116, 118, 120, 122 when the GPU is in an idle state (i.e., not executing instructions or scheduled to execute instructions). As shown in the illustrated example, the temperature of the GPU during the active periods 102, 104, 106, 108, 110 is represented by a solid line and the temperature of the GPU during the idle periods 112, 114, 116, 118, 120, 122 is represented by a line with alternating dots and dashes. In the illustrated example of FIG. 1, during the first idle period 112 (e.g., prior to beginning the first active period 102), the temperature of the GPU is at a true idle temperature 124 ($T_{idle}$) of the GPU, which is typically slightly above an ambient temperature 126 ($T_{ambient}$). The particular temperature values for the idle temperature 124 and the ambient temperature 126 can differ from system to system and the associated environment and/or application for which the system is used. By way of example, the idle temperature 124 and the ambient temperature 126 of many systems are below 50° C. During the first active period 102 (while the first kernel K1 is being executed), the temperature rises until it reaches a maximum temperature 128 ($T_{max}$) and then hovers around that temperature until the first active period 102 is completed. As used herein, the maximum temperature 128 of a processor corresponds to the temperature reached by the processor when operating at the thermal design power (TDP) of the processor. The particular temperature value of the maximum temperature 128 can differ widely from system to system and the associated environment and application for which the system is used. By way of example, it is possible for the maximum temperature 128 of some systems to reach as high as 100° C. or higher. A processor is typically designed to reach its TDP when the processor is being driven to its full capability over a period of time. Many high performance computing applications drive processors to their full capabilities such that the processors will be operating at or near their TDP when in an active state. As a result, it is not uncommon for the maximum temperature 128 to be reached during the execution of SWLs as shown in FIG. 1.

Following the first active period 102, there is a brief idle period 114 during which the GPU is not performing any operations and, therefore, the temperature drops as heat is dissipated from the GPU. However, the duration of this second idle period 114 is not long enough for the GPU to cool very far before the second active period 104 is initiated. Although the second active period 104 is much shorter than the first active period 102, the temperature of the GPU again reaches the maximum temperature 128 because the GPU was already relatively warm when the second active period 104 began. By contrast, the third idle period 116 is much longer than the second idle period 114. As a result, during the third idle period 116 the temperature of the GPU drops nearly back down to the idle temperature 124 before rising again during the third active period 106. The temperature then falls during a fourth idle period 118 before rising again during the fourth active period 108. Thereafter, the temperature drops again and stabilizes at the idle temperature 124 during the fifth idle period 120 before again being driven to the maximum temperature 128 during the fifth active period 110. Following completion of the fifth active period 110, the GPU returns to an idle state (e.g., in a sixth idle period 122) where the temperature of the GPU cools back down to the idle temperature 124.

As shown in the illustrated example of FIG. 1, there are relatively small fluctuations in temperature in the second, third, and fourth active periods 104, 106, 108 as well as in the second, fourth, and fifth idle periods 114, 118, 120. While these fluctuations may cause some stress on the GPU, testing has shown that it is the relatively large temperature fluctuations that are most problematic to the reliability of a GPU over time. That is, the large temperature increases during the first and fifth active periods 102, 110 coupled with the large temperature drops during the third and sixth idle periods 116, 122 in FIG. 1 introduce significant thermal stresses on the solder joints and/or other interfaces of the GPU that can cause degradation and/or failure to occur much more quickly than if the GPU was only subjected to the smaller temperature fluctuations noted above. Particular temperatures changes that constitute relatively large temperature fluctuations as used herein may differ widely from system to system and/or the associated application for which the system is used. In some examples, the size of acceptable temperature fluctuations (e.g., fluctuations that do not constitute relatively large fluctuations that are undesirable) may depend on the level of reliability of the system desired. By way of example, in some examples, a temperature swing of at least 15° C. may be considered to be a relatively large temperature fluctuation the occurrence of which is to be reduced (e.g., minimized and/or avoided). In other examples, the threshold temperature delta that constitutes a relatively large temperature fluctuation may be higher (e.g., 20° C., 25° C., 30° C., 35° C., 40° C., etc.).

Examples disclosed herein reduce the frequency of large thermal fluctuations by reducing the amount by which the temperature of a processor cools during idle periods between adjacent active periods. More particularly, in examples disclosed herein the frequency of large thermal fluctuations are reduced by opportunistically causing the processor to execute workloads during the idle periods as needed to cause the processor to produce heat sufficient to maintain the temperature within a threshold range of the peak temperature reached during the active periods. In the illustrated example of FIG. 1, the peak temperature corresponds to the maximum temperature 128. However, in other examples, the peak temperature may be less than the maximum temperature 128. The workload executed during the idle periods is referred to herein as an idle workload (IWL) to distinguish it from the SWLs executed during the active periods. In some examples, the IWL is controlled to only execute during the idle periods of the processor. As a result, the IWL has no impact on the performance of the GPU when the SWL is being executed because the SWL is only executed during the active periods and not the idle periods.

While the IWL does not affect the performance of the GPU when executing the SWL (because they are executed at different time), execution of the IWL does require additional power. However, this increase in power consumption is a trade-off made to achieve better reliability of the GPU over time (e.g., increase the useful life of the GPU). In some examples, the extent of excess power used to execute the IWL is reduced by setting a timeout period after which the IWL will not execute even if the temperature of the GPU will consequently drop below the threshold temperature above which the GPU was being maintained before the timeout period. That is, in some examples, rather than always maintaining the temperature of a processor within a threshold range of the peak temperature, execution of the IWL may timeout, thereby allowing the GPU to fully cool down during an idle period. This can save power in situations where an idle period extends for a relatively long duration of time. That is, there may be a long duration of time when there is no SWL to be executed such that there is no need to maintain the GPU at an elevated temperature and doing so unnecessarily consumes power. Limiting the implementation of the IWL to a timeout period ensures that the IWL does not unnecessarily consume power indefinitely when there may be extended periods of no standard (e.g., user) activity (e.g., no SWL to be executed).

Figure 2:
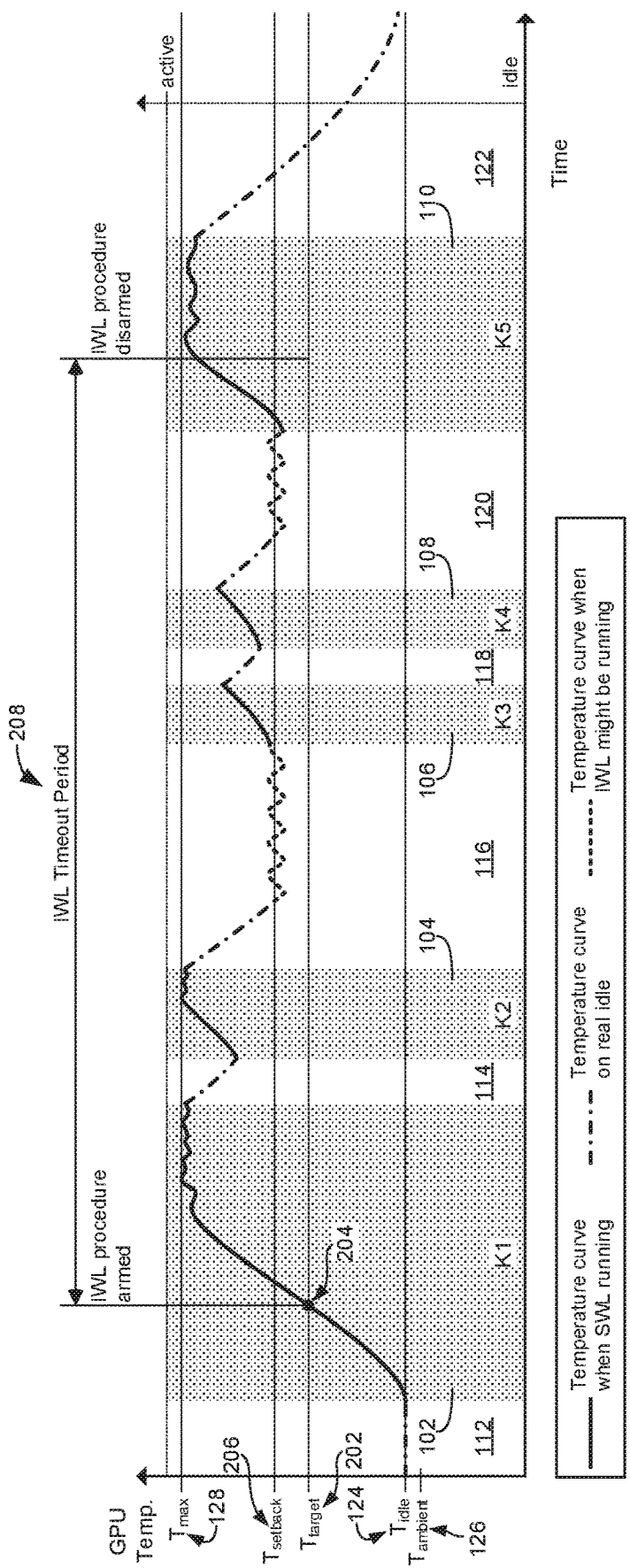
FIG. 2 illustrates an example temperature profile of the processor of FIG. 1 when executing the standard workload of FIG. 1 in accordance with teachings disclosed herein.

FIG. 2 illustrates the temperature of the same GPU of FIG. 1 executing the same five-kernel SWL represented in FIG. 1 except with an IWL executed during at least some portion(s) of some of the idle periods 112, 114, 116, 118, 120, 122 to maintain the temperature of the GPU above a fixed target temperature 202 ($T_{target}$). While FIG. 2 is described with reference to a GPU, teachings disclosed herein may be suitably adapted to any type of processor. In this example, the target temperature 202 is a configurable parameter that is set with a fixed temperature value defined based on known properties of the underlying processor (e.g., the GPU) in conjunction with expected uses of the processor. More particularly, in some examples, the target temperature 202 is defined to be within a particular range of an expected peak temperature for the processor (e.g., the maximum temperature 128 in FIG. 2). In some examples, the particular range is defined to be less than the temperature differential of large thermal fluctuations that are to be avoided to improve the reliability of the processor. How large the thermal fluctuations need to be to constitute large thermal fluctuations may depend on the level of reliability and/or useful life desired for the processor and on physical characteristics of the processor, its packaging, the location where it is mounted (e.g., on a PCB), and/or the characteristics of the mounting mechanism employed (e.g., flip chip, conventional, solder type, etc.).

In the illustrated example of FIG. 2, the target temperature 202 defines the temperature of the GPU at which an IWL procedure is armed or initiated. Thus, as shown in FIG. 1, the point 204 where the temperature of the GPU reaches the target temperature 202 defines when the IWL procedure is armed or activated. The IWL procedure involves the monitoring of the temperature of the GPU during idle periods to identify conditions that trigger the execution of an IWL to maintain the temperature of the GPU within a threshold temperature range of the maximum temperature 128. In other words, while the arming or enabling of the IWL procedure does not necessarily imply that a particular IWL will be executed, arming the IWL procedure at least initiates the system to begin monitoring for conditions that may call for an IWL to be executed.

In some examples, the threshold temperature range within which the IWL procedure maintains the GPU corresponds to the difference between the maximum temperature 128 and the target temperature 202. In some examples, the temperature of the GPU is kept within this range (e.g., kept above the target temperature 202) by executing an IWL in response to a trigger condition corresponding to the temperature of the GPU falling below a setback temperature 206 ($T_{setback}$). In some examples, the trigger condition is limited to idle periods 112, 114, 116, 118, 120, 122. That is, in some examples, no IWL is executed during an active period 102, 104, 106, 108, 110 even if the temperature drops below the setback temperature 206.

In the illustrated example, the setback temperature 206 is a configurable parameter defined to be higher than the target temperature by a particular temperature difference or delta. Additionally or alternatively, in some examples, the setback temperature 206 may be defined as some temperature delta below the maximum temperature 128 (e.g., that is less than the difference between the maximum temperature 128 and the target temperature 202). As shown in the illustrated example, during the second idle period 114, the temperature of the GPU remains above the setback temperature 206. As a result, there is no need to add heat to the GPU such that no IWL is executed in that period 114. However, during the third idle period 116, the temperature of the GPU does drop below the setback temperature. However, unlike the temperature cooling off to near the idle temperature 124 (as in FIG. 1), in the illustrated example of FIG. 2, once the temperature drops below setback temperature 206, an IWL is executed by the GPU to produce heat, thereby maintaining the temperature of the GPU above the target temperature 202 and near the setback temperature 206. In some examples, the IWL is executed entirely in the GPU (e.g., without writing to an off chip memory). In other examples, the IWL may be executed by the GPU in communication with a separate processor, memory, and/or IC package. In some examples, off chip operations may be implemented in a package that is adjacent to the GPU so that heat produced by the adjacent package contributes to increase the temperature of the GPU. In some examples, execution of the IWL may be continuous through the end of the idle period 116 (e.g., the IWL may include a set of commands that may loop indefinitely). In other examples, execution of the IWL may be intermittent with each instance heating up the GPU before there is a break in which the GPU cools down before another instance of the IWL is executed to again heat up the GPU. In some examples, this intermittent heating and cooling of the GPU around the setback temperature 206 incorporates some hysteresis such that the temperature of the GPU rises above the setback temperature 206 and falls below the setback temperature 206 as represented in FIG. 2. In other examples, the intermittent heating and cooling of the GPU by intermittently executing instances of an IWL may maintain the temperature at or below the setback temperature 206 (and above the target temperature 202) throughout the process. In some examples, execution of an IWL may be triggered when the temperature of the GPU drops to the target temperature 202 and execution of the IWL is stopped when the temperature returns to the setback temperature 206. In some examples, execution of the IWL has no purpose other than to heat the GPU. In this manner, execution of the IWL can be interrupted at any time without any meaningful loss of data to quickly transition to executing SWL if a new active period begins during ongoing execution of the IWL. In some examples, execution of the IWL may provide a useful purpose that is secondary and/or separate to heating the processor. For instance, in some examples, a primary processor (CPU) may offload tasks to the GPU that serve a purpose to the operation of the primary processor. In some examples, such offloaded tasks may be non-critical tasks so that they can be terminated and/or interrupted to enable the GPU to transition to its primary purposes of executed SWLs. Additionally or alternatively, in some examples, other remoted devices (e.g., in an edge network) may provide requests to the GPU that serve as IWLs to heat the GPU during otherwise idle periods.

As shown by comparison with FIG. 1, the execution of the IWL during the third idle period 116 as represented in FIG. 2 maintains the temperature of the GPU above the target temperature 202 throughout the entirety of the third idle period 116. As a result, the large temperature drop represented in the third idle period 116 of FIG. 1 is avoided. Furthermore, the temperature of the GPU remains above the target temperature 202 through the third and fourth active periods 106, 108 and the fourth and fifth idle periods 118, 120. As a result, the temperature of the GPU is already elevated when the fifth active period 110 begins, as represented in FIG. 2, thereby avoiding the large temperature increase represented in FIG. 1 during the corresponding active period 110. Thus, whereas the temperature profile of the GPU represented in FIG. 1 includes two large thermal fluctuations reaching up to around the maximum temperature 128 and down to around the idle temperature 124, the temperature profile of the GPU represented in FIG. 2 includes only one such cycle through the high and low temperatures at the beginning and after the ending of the IWL procedure.

As shown in the illustrated example, the IWL procedure is associated with an IWL timeout period 208 that defines a duration for the IWL procedure beginning when it is first armed or initiated (e.g., when the temperature of the GPU first passes the target temperature 202). After the timeout period 208 has elapsed, the IWL procedure is disarmed or deactivated meaning that the temperature of the GPU is no longer monitored for the trigger condition (e.g., dropping below the temperature setback 206 during an idle period) that causes execution of an IWL. Rather, as represented in FIG. 2, after the IWL procedure is disarmed or disabled, the temperature of the GPU is allowed to fall below the setback temperature 206 and the target temperature 202 (e.g., during the sixth idle period 122). If a subsequent SWL is executed that causes the temperature to again rise above the target temperature 202, the IWL procedure would again be armed or enabled and continue for another timeout period 208.

In the particular example of FIG. 2, the timeout period 208 ends during the fifth active period 110. However, this is merely a function of timing of the active periods 102, 104, 106, 108, 110 of the illustrated example relative to the duration of the timeout period 208. In other situations, the timeout period 208 may end during an idle period. For instance, assume that the SWL only included the first four kernels (K1 through K4) such that the entire time extending from the fifth idle period 120 through the sixth idle period 120 was one continuous idle period. In such a scenario, the IWL procedure would maintain the temperature of the GPU hovering around the setback temperature 206 (as represented by the last portion of the fifth idle period 120 in FIG. 2) all the way until the IWL procedure is disarmed or terminated. After that point, the GPU would be allowed to cool to the idle temperature 124. Notably, if there was no timeout period 208, the IWL procedure would maintain the temperature of the GPU hovering around the setback temperature 206 indefinitely. Executing an IWL indefinitely with no subsequent SWL to execute is a waste of energy. Accordingly, applying the timeout period 208 to the IWL procedure serves to save power while still reducing the number of large thermal fluctuations.

In the illustrated example of FIG. 2, the IWL timeout period 208 is a configurable parameter that is defined to have a fixed duration. In some examples, the duration of the timeout period 208 is defined based on a threshold frequency of large thermal fluctuations to which the GPU is to be subject. For instance, testing has shown that the reliability of processors begins to degrade significantly when such processors experience a significant amount of large thermal fluctuations during their user. What constitutes a significant amount of large thermal fluctuations depends on the particular processor being heated and cooled, the rate of the heating and cooling, and/or other factors. However, if the number of large thermal fluctuations within a given period that would begin to cause the reliability of a processor to degrade, it may be possible to select a suitable timeout period to avoid that number of fluctuations in the given period. For example, assume that a particular processor is found to begin to degrade when more than 30 large thermal fluctuations a day. In such a scenario, to guarantee that no more than 30 thermal fluctuations are experienced in a day, the timeout period 208 may be set to $\frac{1}{30}^{th}$ of a day (e.g., 48 minutes). In some examples, the timeout period 208 may be set for a longer or shorter period depending on the level of reliability desired and/or the importance of reducing power consumption. More generally, the timeout period 208 and/or any other parameter(s) defining the implementation of teachings disclosed herein may be modified in response to an ongoing quasi-static or dynamic reliability lifetime analysis and/or based on any other factors relevant to the particular scenario in which teachings disclosed herein are implemented. For instance, in some examples, the timeout period 208 depends on the time of day (e.g., shorter during evening hours when it is less likely to be used by a user), day of the week (e.g., shorter during weekends), time of year (e.g., winter versus summer), etc. In some examples, the timeout period 208 is determined based on historical usage patterns. In some examples, the timeout period 208 changes based on the number of thermal fluctuations that have occurred within a given period (e.g., the timeout period increases if fluctuations are observed relatively regularly and decreases if fluctuations are observed relatively rarely).

In some examples, rather than defining the timeout period 208 as a fixed duration measured from when the IWL procedure is first enabled or armed, the IWL procedure may be disabled or disarmed based on the duration and/or spacing of the active periods relative to the idle periods. For instance, in some examples, the IWL procedure is disarmed whenever a single continuous idle period extends beyond a threshold idle time period. That is, in some examples, a timer begins counting as soon as an idle period has begun. If a subsequent active period begins before the threshold idle period duration elapses, the timer is reset and does not begin counting again until the subsequent active period ends and a new idle period begins. However, if an idle period extends longer than the threshold idle period duration, the IWL procedure ends and is disarmed. In some examples, the threshold idle period duration is significantly less than the timeout period 208 described above so as to reduce the amount of time that power is consumed executing IWLs when there is no immediate need to maintain the GPU at an elevated temperature. While this approach can improve power efficiency, this approach may increase the total number of thermal fluctuations experienced over time if the active periods are spaced apart by more than the threshold duration but occur at a frequency that is more often than the timeout period 208 described above. To avoid this possibility, in some examples, the threshold idle time period only begins counting after the timeout period 208 has elapsed. That is, in some examples, the IWL procedure is configured to continue for at least the timeout period 208. Thereafter, the IWL period only ends and is disarmed once a subsequent idle period extends longer than the threshold idle time period.

Defining a fixed target temperature 202 and an associated fixed setback temperature 206 as described in connection with FIG. 2 is suitable when the peak temperature reached by the GPU is relatively consistent and known in advance. For instance, fixed values for these parameters are often suitable for high performance computing applications where it is expected that the GPU will reach the maximum temperature 128 and that the maximum temperature is known. In some situations, the maximum temperature 128 may not be known and/or the usage of the GPU may be such that it does not always reach the maximum temperature 128. Accordingly, in some examples, a target temperature may be defined dynamically relative to maximum and/or minimum temperatures observed for GPU during relevant periods of time as shown and described in connection with FIG. 3.

Figure 3:
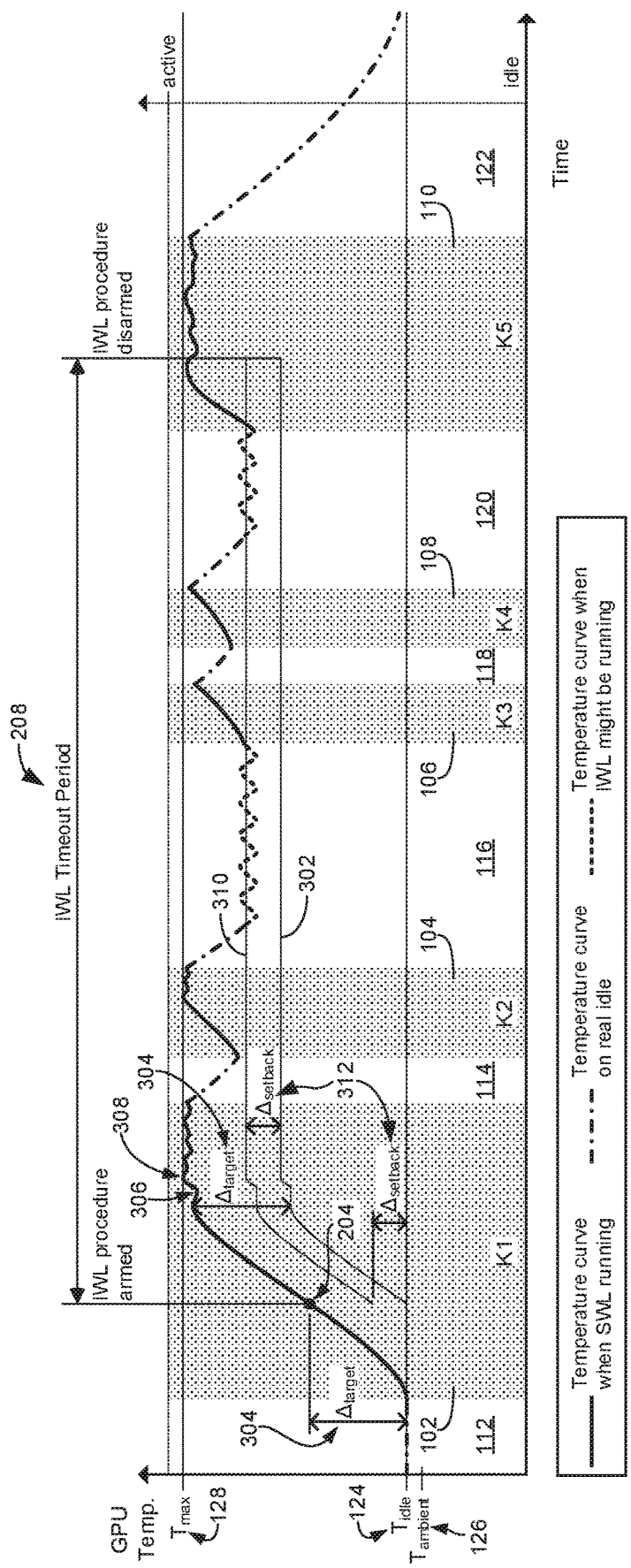
FIG. 3 illustrates another example temperature profile of the processor of FIG. 1 when executing the standard workload of FIG. 1 in accordance with teachings disclosed herein.

In particular, FIG. 3 illustrates the temperature of the same GPU of FIG. 1 executing the same five-kernel SWL represented in FIG. 1 except with an IWL executed during at least some portion(s) of some of the idle periods 112, 114, 116, 118, 120, 122 to maintain the temperature of the accelerator above a dynamic target temperature (represented over time by the line identified by reference numeral 302). As with FIGS. 1 and 2, while FIG. 3 is described with reference to a GPU, teachings disclosed herein may be suitably adapted to any type of processor. As shown in the illustrated example, during the IWL procedure, the dynamic target temperature 302 is defined to be threshold or target temperature delta 304 below an armed maximum temperature of the GPU. As used herein, the armed maximum temperature is the maximum temperature of the GPU observed since the IWL procedure was first armed or initiated. Thus, in the illustrated example, at point 204 when the IWL procedure is first armed, the maximum temperature observed corresponds to the current temperature of the GPU. Thus, the initial armed maximum time corresponds to the temperature of the GPU at the time the IWL procedure is armed. As time progresses, the temperature of the GPU continues to increase. As a result, the armed maximum temperature also increases because each new sample of the temperature constitutes a new maximum since the IWL procedure was armed. If the current temperature of the GPU drops from a previously higher maximum (e.g., at the dip 306 in FIG. 3), the armed maximum temperature does not drop but remains at the highest observed temperature. Thus, once the temperature of the GPU reaches the maximum temperature 128 (e.g., at point 308 in FIG. 3), this will become the armed maximum temperature for the remainder of the IWL procedure. As defined above, the dynamic target temperature 302 is defined to be the target temperature delta 304 below the armed maximum temperature. Thus, as shown in the illustrated example, the dynamic target temperature 302 begins at the idle temperature 124 (which is the target temperature delta 304 below the temperature of the GPU at point 204 in this example) and varies over time to follow the increasing temperature of the GPU during the first active period 102. Notably, the dynamic target temperature 302 remains constant during the dip 306 in the GPU temperature because the armed maximum temperature is also constant during the time. The dynamic target temperature 302 then rises in conjunction with the temperature reaching the maximum temperature 128 at point 308 and then the dynamic target temperature remains constant for the remainder of the IWL procedure.

As described above, the target temperature 202 in FIG. 2 is a fixed value that defines both the temperature at which the IWL procedure is armed or initiated and also the target temperature above which the GPU is maintained during the IWL procedure. By contrast, in the illustrated example of FIG. 3, the temperature at which the IWL procedure is armed is defined independent of the dynamic target temperature 302 used during the IWL procedure. In particular, while the dynamic target temperature 302 during the IWL procedure is defined to be a target temperature delta 304 below the armed maximum temperature, the IWL procedure is first armed or activated when the temperature of the GPU reaches the target temperature delta 304 above a disarmed minimum temperature. As used herein, the disarmed minimum temperature refers to the minimum temperature of the GPU observed since the IWL procedure was last disarmed or ended. Thus, in the illustrated example, during the first idle period 112 the minimum temperature observed corresponds to the idle temperature 124. Thus, the IWL procedure is armed when the GPU temperature rises to a temperature corresponding to the target temperature delta 304 above the idle temperature 124.

As mentioned above, the dynamic target temperature 302 initially begins at the target temperature delta 304 below the temperature of the GPU at the time the IWL is initially armed. Inasmuch as the IWL procedure is initially armed when the GPU temperature is above the disarmed minimum temperature by the target temperature delta 304, the initial temperature of the dynamic target temperature 302 corresponds to the disarmed minimum temperature prior to the IWL procedure being armed. This is the reason that the initial target temperature 302 corresponds to the idle temperature 124 when the IWL procedure begins as represented in the illustrated example of FIG. 3 as noted above. However, if the disarmed minimum temperature was higher than idle temperature 124 when the IWL procedure is initiated (e.g., the GPU did not have an opportunity to fully cool since the ending of a previous IWL procedure), the initial dynamic target temperature 302 would also be higher than the idle temperature 124.

During the IWL procedure of FIG. 3, the temperature of the GPU is monitored to identify a trigger condition to cause the GPU to execute an IWL to maintain the temperature of the GPU above the target temperature 302. In the illustrated example, the trigger condition corresponds to the temperature of the GPU falling below a setback temperature (T setback) (represented over time by the line identified by reference numeral 310). In some examples, the setback temperature 310 of FIG. 3 serves the same purpose as the setback temperature 206 described above in connection with FIG. 2. However, unlike the setback temperature 206 of FIG. 3, which is a fixed temperature, the setback temperature 310 varies across time relative to changes in the dynamic target temperature 302. More particularly, the setback temperature 310 of FIG. 3 is a configurable parameter defined to be a setback temperature delta 312 above the target temperature 302. Thus, as the target temperature 302 increases, the setback temperature 310 also increases. In this manner, regardless of how high the temperature of GPU rises (e.g., regardless of the armed maximum temperature), if the temperature begins to drop and decreases below the setback temperature 310, the execution of an IWL will be initiated to prevent the temperature from falling as low as the target temperature 302. As a result, large thermal fluctuations that can impose undue stress on the GPU are avoided during the IWL procedure.

As described above, the IWL procedure implemented in the illustrated examples of FIGS. 2 and 3 limits the execution of IWLs to the idle periods 112, 114, 116, 120, 122 so as to not interfere with the performance of the GPU during the active periods. In such an approach, there is still the possibility of large thermal fluctuations during the active periods 102, 104, 106, 108, 110. That is, in some situations, SWLs may be scheduled for execution, thereby establishing the GPU as being in an active state, but the SWLs may not require the GPU to operate at full capacity. As a result, the temperature of the GPU may drop to relatively low temperatures (e.g., below the target temperature 202, 302). In some examples, the possibility of such thermal fluctuations are assumed to be relatively rare and/or to have an acceptable impact on the reliability of the GPU in view of the importance of not interfering with the performance of the GPU. However, in some examples, if reliability is of greater concern to a user than performance, the IWL procedure may provide IWLs to the GPU for execution during the active periods if needed to maintain the temperature of the GPU above the target temperature 202, 302. In such examples, there would be no need to monitor or determine whether the GPU is in an active state or an idle state. Rather, the only trigger for the execution of an IWL would be whether the current temperature is above or below the setback temperature 206, 310.

As noted above, in examples where the execution of IWLs is limited to idle periods so as not to affect performance of the execution of any SWL during the active periods, there is a possibility that some large thermal fluctuations may occur within the active periods. In some examples, the IWL procedure includes a mechanism to disarm or deactivate prior to the timeout period 208 expiring in response to such situations so as not to exacerbate the problem and increase the frequency and/or extent of thermal fluctuations. For instance, assume the particular SWL executed by the GPU during the first active period 102 results in the temperature of the GPU initially rising enough to trigger the activation or arming of the IWL procedure and then dropping back down close to the idle temperature before the active period 102 ends. With the IWL procedure now armed, upon entering the following idle period 114, the trigger condition for executing IWLs based on the temperature of the GPU being below the setback temperature 206, 310 would be satisfied. As a result, the IWL procedure would provide IWLs to the GPU for execution to drive up the temperature of the GPU toward the setback temperature 206, 301. However, as can be seen, because the initial temperature of the GPU at the beginning of the idle period 114 was low (e.g., at or near the idle temperature), this process would produce a large thermal fluctuation rather than avoid it. Accordingly, in some examples, if a relatively large drop in temperature (e.g., above a threshold) is detected during an active period, the IWL procedure is automatically disarmed or deactivated.

Figure 4:
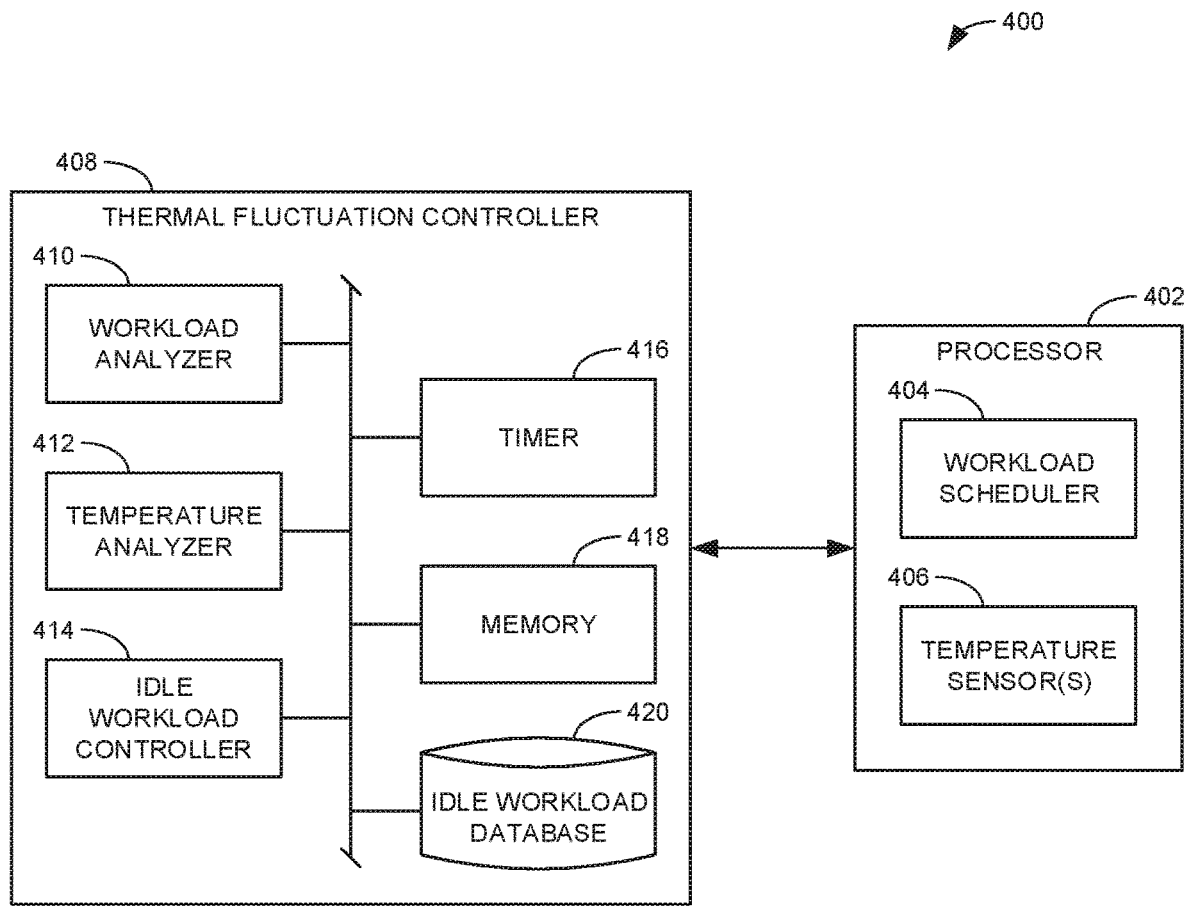
FIG. 4 illustrates an example computing system constructed in accordance with teachings disclosed herein.

FIG. 4 illustrates an example computing system 400 constructed in accordance with teachings disclosed herein. The example computing system 402 includes a processor 402 to execute SWLs provided by a user. The processor 402 may be any type of processor such as a central processing unit (CPU), graphics processing unit (GPU), an accelerator, etc. As shown in the illustrated example, the processor 402 includes an example workload scheduler 404 and one or more temperature sensor(s) 406. The example workload scheduler 404 receives workloads submitted from a user (e.g., SWLs) and schedules the workloads for execution. The example temperature sensor(s) 406 monitor the temperature of the processor 402 and output signals indicative of the temperature. Thus, the temperature sensor(s) 406 are a means for sensing the temperature of the processor 402. In some examples, one or more of the temperature sensor(s) are included within a package of the processor 402. In some examples, one or more of the temperature sensor(s) 406 are mounted on a surface of a package of the processor 402. In some examples, one or more of the temperature sensor(s) are mounted adjacent to a package of the processor 402 (e.g., on an adjacent PCB).

Additionally, the example computing system 400 of FIG. 4 includes an example thermal fluctuation controller 408 to reduce thermal fluctuations in the processor 402 due to the heating and cooling of the processor 402 during active and idle periods as outlined above in connection with FIGS. 1-3. That is, the example thermal fluctuation controller 408 monitors the temperature of the processor 402 and the activity of the processor 402 to provide IWLs for execution by the processor 402 at suitable times (e.g., during idle periods) to maintain the temperature of the processor 402 within a threshold range of a peak temperature. As represented in the illustrated example of FIG. 4, the thermal fluctuation controller 408 is external to the processor 402 and associated with a separate processor. For example, the thermal fluctuation controller 408 may be implemented by a CPU that interacts with the processor 402, which may be a GPU. In other examples, the thermal fluctuation controller 408 may be internal to and implemented by the processor 402 itself. In some examples, at least some functionalities of the thermal fluctuation controller 408 are implemented internally by the processor 402 and at least some functionalities of the thermal fluctuation controller 408 are implemented externally by a different processor.

As shown in the illustrated example of FIG. 4, the thermal fluctuation controller 408 includes an example workload analyzer 410, an example temperature analyzer 412, an example idle workload controller 414, an example timer 416, example memory 418, and an example idle workload database 420. The example workload analyzer 410 analyzes the current state of the processor 402 to determine whether the processor 402 is currently active (e.g., executing or scheduled to execute a SWL) or currently idle (e.g., in an idle period). More particularly, in some examples, the workload analyzer 410 is in communication with the workload scheduler 404 of the processor 402 and/or has access to schedule information generated by the workload scheduler 404. The workload analyzer 410 analyzes such schedule information to confirm whether any SWL submissions have been provided to the scheduler for execution. If at least one SWL submission is scheduled for execution, the workload analyzer 410 determines that the processor 402 is in an active state with pending SWLs to execute. If the schedule information indicates that no pending SWL submissions are scheduled to be executed, the workload analyzer 410 determines that the processor 402 is in an idle state. Thus, in some examples, the workload analyzer 410, as a structure, is a means for analyzing a workload to determine whether the processor 402 is in an idle state or an active state. In some examples, the workload analyzer 410 is one of hardware, firmware, or software. In some examples, the workload analyzer 410 is a processor, a dedicated processor unit, a digital signal processor (DSP), etc. Alternatively, the example workload analyzer 410 may be a block of code embodied as transistor logic (firmware) or software.

The example temperature analyzer 412 is in communication with the temperature sensor(s) 406 of the processor 402 and/or has access to the temperature data output by the temperature sensor(s) 406. In some examples, the temperature analyzer 412 analyzes the temperature data to determine a temperature of the processor 402. In some examples, different portions of the processor 402 may be at different temperatures such that different temperature sensors 406 output different measured temperatures. In some examples, the temperature analyzer 412 identifies the highest reported temperature as the temperature of the processor 402 to be used in subsequent analysis. In some examples, a different temperature than the highest reported temperature may be used (e.g., the lowest reported temperature, an average of temperatures reported by some or all of the temperature sensors 406, etc.). In some examples, the temperature analyzer 412 compares the temperature of the processor 402 to one or more parameters (e.g., thresholds, set points, temperature ranges, etc.) associated with the initiation and/or implementation of the IWL procedure discussed above in connection with FIGS. 1-3. For example, if a fixed target temperature 202 is defined, the temperature analyzer 412 compares the temperature of processor 402 to the target temperature 202 to determine when to arm or enable the IWL procedure. If a dynamic target temperature 302 is to be used, the temperature analyzer 412 compares the temperature of the processor 402 to the disarmed minimum temperature plus the target temperature delta 304 to determine when to arm the IWL procedure. Once the IWL procedure is armed, the temperature analyzer 412 compares the temperature of the processor 402 to the setback temperature (which may be a fixed setback temperature 206 as described in FIG. 2 or a dynamic setback temperature 310 as described in FIG. 3) to determine whether an IWL needs to be executed to maintain the temperature of the processor 402 above the corresponding target temperature 202, 302. In some examples, the temperature analyzer 412 is one of hardware, firmware, or software. In some examples, the temperature analyzer 412 is a processor, a dedicated processor unit, a digital signal processor (DSP), etc. Alternatively, the example workload analyzer 410 may be a block of code embodied as transistor logic (firmware) or software. In some examples, the temperature analyzer 412 includes and/or is incorporated with the temperature sensor(s) 406.

The example idle workload controller 408 of the illustrated example controls the initiation, operation, and termination of the IWL procedure. Thus, in some examples, the idle workload controller 408, as a structure, is a means for controlling an IWL procedure. That is, when feedback from the temperature analyzer 412 indicates that the temperature conditions indicate the IWL procedure is to be armed, the idle workload controller 414 arms or initiates the IWL procedure. When feedback from the temperature analyzer 412 indicates the temperature of the processor 402 has dropped below the setback temperature 206, 310, the idle workload controller determines whether to submit an IWL submission to the workload scheduler 404 of the processor 402 to execute the IWL. In some examples, execution of an IWL is to be limited to idle periods. Accordingly, in some examples, the idle workload controller 414 also uses feedback from the workload analyzer 410 to determine whether the processor 402 is currently in an active state or an idle state. In some examples, the particular IWL provided to the processor 402 for execution is selected from the idle workload database 420. In some examples, there may be multiple different IWLs that the idle workload controller 414 may select. The different IWLs may correspond to any suitable set of commands that may be provided to the processor for execution. Different IWLs may be defined to affect the temperature of the processor 402 in different ways (e.g., heat it faster or slower). In some examples, the IWLs are defined as relatively simply workloads that may be looped so that execution may be ongoing until such time as the IWL is no longer needed (e.g., the temperature of the processor 402 has been raised back up to or above the setback temperature 206, 310). In some examples, the IWLs are defined to have multiple threads to cause different execution units of the processor 402 to operate at the same time for a more evenly distributed heating of the GPU.

The example timer 416 of the example thermal fluctuation controller 408 is used by the idle workload controller 414 to determine when to end or disarm the IWL procedure. That is, in some examples, the idle workload controller 414 starts the timer 416 when the IWL procedure is first armed. When the timer 416 reaches the timeout period 208, the idle workload controller 414 terminates or disarms the IWL procedure.

The example memory 418 is used to store values for the parameters used during the IWL procedure. In some examples, these values may be configured once by a user (or defined by an original equipment manufacturer) and remain fixed until changed by the user (e.g., the fixed target temperature 202, the temperature setback 206, the timeout period 208, the target temperature delta 304, the setback temperature delta 312). In some examples, the values in the memory are updated on an ongoing basis based on changing circumstances (e.g., the dynamic target temperature 302, the dynamic setback temperature 310, the armed maximum temperature, the disarmed minimum temperature, the current temperature of the processor 402, etc.).

While an example manner of implementing the thermal fluctuation controller 408 is illustrated in FIG. 4, one or more of the elements, processes and/or devices illustrated in FIG. 4 may be combined, divided, re-arranged, omitted, eliminated and/or implemented in any other way. Further, the example workload analyzer 410, the example temperature analyzer 412, the example idle workload controller 414, the example timer 416, the example memory 418, the example idle workload database 420, and/or, more generally, the example thermal fluctuation controller 408 of FIG. 4 may be implemented by hardware, software, firmware and/or any combination of hardware, software and/or firmware. Thus, for example, any of the example workload analyzer 410, the example temperature analyzer 412, the example idle workload controller 414, the example timer 416, the example memory 418, the example idle workload database 420 and/or, more generally, the example thermal fluctuation controller 408 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workload analyzer 410, the example temperature analyzer 412, the example idle workload controller 414, the example timer 416, the example memory 418, and/or the example idle workload database 420 is/are hereby expressly defined to include a non-transitory computer readable storage device or storage disk such as a memory, a digital versatile disk (DVD), a compact disk (CD), a Blu-ray disk, etc. including the software and/or firmware. Further still, the example thermal fluctuation controller 408 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
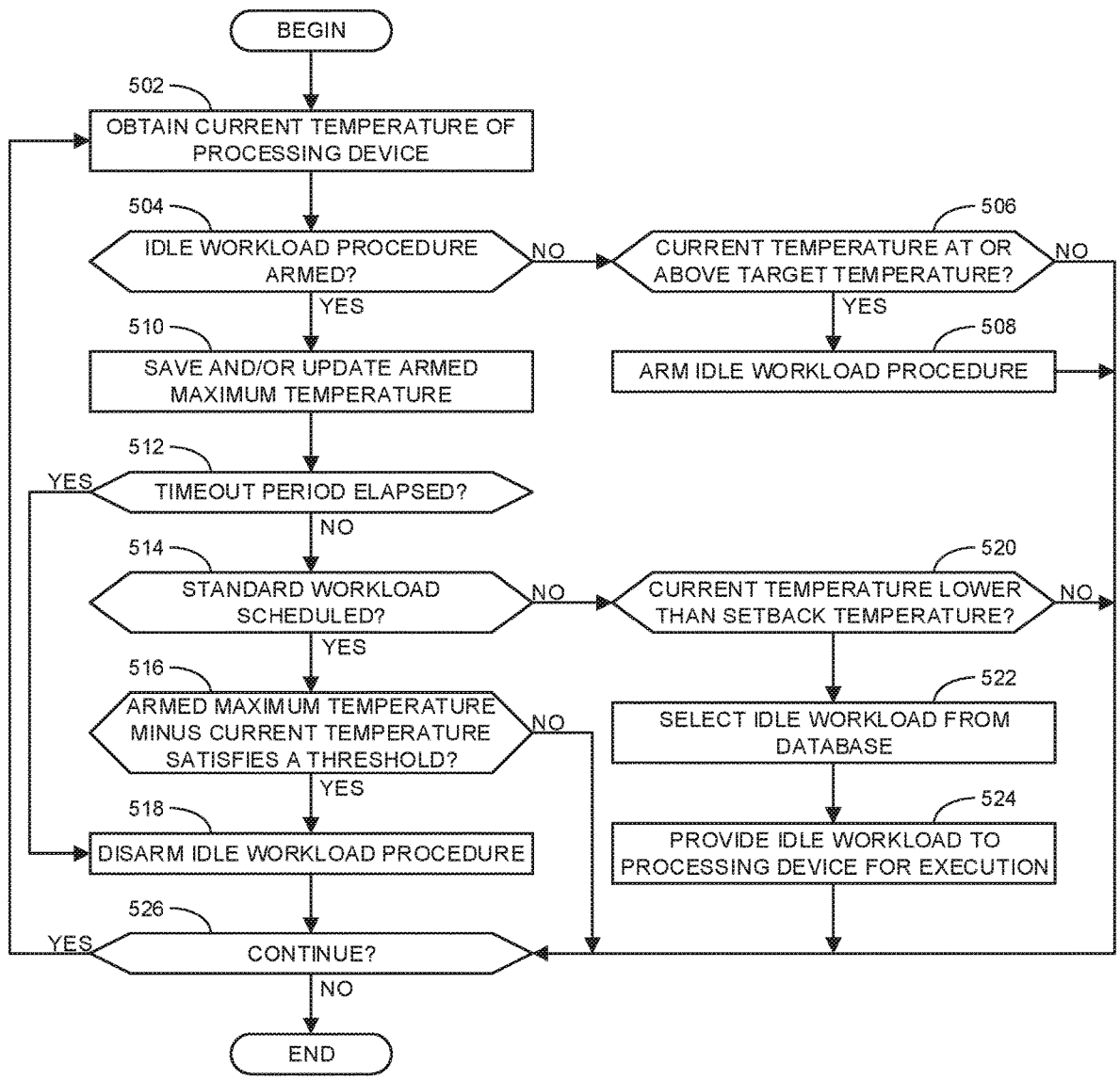
FIGS. 5 and 6 are flowcharts representative of example machine readable instructions that may be executed to implement the example thermal fluctuations controller of FIG. 4.
Figure 6:
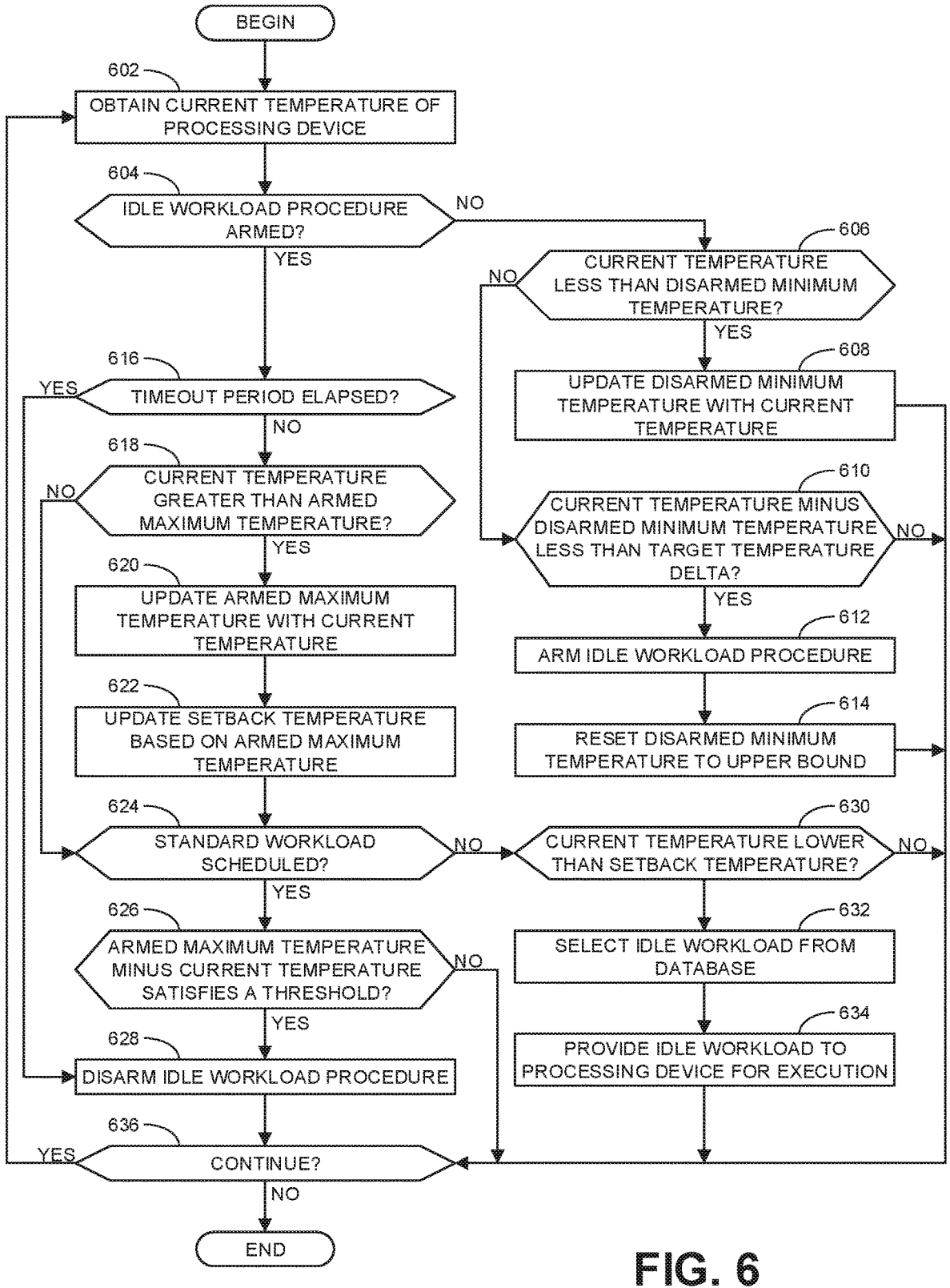

Flowcharts representative of example hardware logic, machine readable instructions, hardware implemented state machines, and/or any combination thereof for implementing the thermal fluctuation controller 408 of FIG. 4 is shown in FIGS. 5 and 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example programs are described with reference to the flowcharts illustrated in FIGS. 5 and 6, many other methods of implementing the example thermal fluctuation controller 408 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 5 and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The flowchart of FIG. 5 represents example machine readable instructions to implement the thermal fluctuation controller 408 of FIG. 4 using a fixed target temperature 202 as described above in connection with FIG. 2. The program of FIG. 5 begins at block 502 where the example temperature analyzer 412 obtains the current temperature of the processor 402. At block 504, the example idle workload controller 414 determines whether the IWL procedure is armed. If not, control advances to block 508 where the example temperature analyzer 412 determines whether the current temperature is at or above the target temperature 202. If not, there is no need to arm the IWL procedure. Accordingly, control advances to block 526 where the thermal fluctuation controller 408 determines whether to continue the process. If so, control returns to block 502 to obtain an updated measurement of the current temperature. Returning to block 506, if the example temperature analyzer 412 determines that the current temperature is at or above the target temperature 202, control advances to block 508 where the example idle workload controller 414 arms the IWL procedure. In the illustrated example, arming the IWL procedure initiates the monitoring of the temperature of the processor 402 relative to the setback temperature 206. Further, arming the IWL procedure includes starting the example timer 416 to count towards the timeout period 208. In some examples, rather than starting a timer, the idle workload controller 414 may store the current time (as indicated by the timer 416) in the example memory 418 as a point of reference to compare against the timeout period 208 as time progresses. After the IWL procedure is armed at block 508, control advances to block 526.

Returning to block 504, if the example idle workload controller 414 determines that the IWL procedure is armed, control advances to block 510. At block 510, the example idle workload controller saves and/or updates (e.g., in the example memory 418) an armed maximum temperature controller. That is, if the most recent measurement of the current temperature (obtained at block 502) is the highest temperature observed since the IWL procedure was first armed, that temperature is set as the armed maximum temperature. If the current temperature is less than the armed maximum temperature, the armed maximum temperature remains unchanged.

At block 512, the example idle workload controller 414 determines whether the timeout period 208 has elapsed. If not, control advances to block 514 where the example workload analyzer 410 determines whether any SWL is scheduled. If so, then no IWL is to be executed so as to not interfere with the performance of the processor 402 when executing the SWL. Accordingly, control advances to block 516 where the example temperature analyzer 412 determines whether the armed maximum temperature (set at block 510) minus the current temperature (obtained at block 502) satisfies (e.g., is greater than) a threshold. Block 516 serves to identify situations where large temperatures drops (e.g., exceeding the threshold) occur during an active period so as to not inadvertently cause the temperature of the processor 402 to increase during an idle period if it has already cooled during a preceding active period. Thus, if the threshold is satisfied (e.g., the difference between the armed maximum temperature and the current temperature exceeds the threshold), control advances to block 518 where the example idle workload controller 414 disarms the IWL procedure. Thereafter, control advances to block 526 to determine whether to continue the process as discussed above. If the example temperature analyzer 412 determines, at block 516, that the threshold is not satisfied, control advances directly to block 526 such that the IWL procedure remains armed.

Returning to block 514, if the example workload analyzer 410 determines that no SWL is scheduled, control advances to block 520 where the example temperature analyzer 412 determines whether the current temperature is lower than the setback temperature 206. In some examples, if reliability is more important than performance and the potential for large thermal fluctuations during active periods are to be avoided, blocks 514 and 516 may be omitted. In such examples, if the timeout period has not elapsed (as determined at block 512), control advances directly to block 520. If the example temperature analyzer 412 determines, at block 520, that the current temperature is not lower than the setback temperature 206, then no action needs to be taken so control advances directly to block 526. However, if the current temperature is lower than the setback temperature 206, control advances to block 522 where the example idle workload controller 414 selects an IWL from the example idle workload database 420. At block 524, the example idle workload controller 414 provides the IWL to the processor 402 for execution. Thereafter, control advances to block 526.

Returning to block 512, if the example idle workload controller 414 determines that the timeout period 208 has elapsed, control advances to block 518 where the example idle workload controller 414 disarms the IWL procedure. Thereafter, control advances to block 526 to determine whether to continue the process as discussed above. If so, control again returns to block 502. If not, the example process of FIG. 5 ends.

The flowchart of FIG. 6 represents example machine readable instructions to implement the thermal fluctuation controller 408 of FIG. 4 using a dynamic target temperature 302 as described above in connection with FIG. 3. The program of FIG. 6 begins at block 602 where the example temperature analyzer 412 obtains the current temperature of the processor 402. At block 604, the example idle workload controller 414 determines whether the IWL procedure is armed. If not, control advances to block 608 where the example temperature analyzer 412 determines the current temperature is less than the disarmed minimum temperature. If so, control advanced to block 608 where the idle workload controller 414 updates the disarmed current temperature with the current temperature. That is, the current temperature becomes the new disarmed minimum temperature. Thereafter, control advances to block 636 where the thermal fluctuation controller 408 determines whether to continue the process. If so, control returns to block 602 to obtain an updated measurement of the current temperature.

Returning to block 606, if the current temperature is not less than the disarmed minimum temperature, control advances to block 610 where the example temperature analyzer 412 determines whether the current temperature minus the disarmed minimum temperature is less than the target temperature delta 304. If not, there is no need to arm the IWL procedure. Accordingly, control advances to block 636 where the thermal fluctuation controller 408 determines whether to continue the process. If the current temperature minus the disarmed minimum temperature is less than the target temperature delta 304, control advances to block 612 where the example idle workload controller 414 arms the IWL procedure. In the illustrated example, arming the IWL procedure initiates the monitoring of the temperature of the processor 402 relative to the setback temperature 310. Further, arming the IWL procedure includes starting the example timer 416 to count towards the timeout period 208. In some examples, rather than starting a timer, the idle workload controller 414 may store the current time (as indicated by the timer 416) in the example memory 418 as a point of reference to compare against the timeout period 208 as time progresses. After the IWL procedure is armed at block 612, control advances to block 614 where the example idle workload controller 414 resets the disarmed minimum temperature to an upper bound. In some examples, the upper bound can be any suitable higher any expected temperature for the processor 402 (e.g., higher than the maximum temperature 128). In this manner, whenever the IWL becomes disabled again, the current temperature of the processor 402 at that time will be less than the disarmed minimum temperature (as determined at block 606) to then define the disarmed minimum temperature as the current temperature (at block 608). After the disarmed minimum temperature is resent, control advances to block 636 to determine whether to continue the process.

Returning to block 604, if the example idle workload controller 414 determines that the IWL procedure is armed, control advances to block 616. At block 616, the example idle workload controller 414 determines whether the timeout period 208 has elapsed. If not, control advances to block 618 where the example temperature analyzer 412 determines whether the current temperature is greater than the armed maximum temperature. If so, control advances to block 620 where the idle workload controller 414 updates the armed maximum temperature with the current temperature. That is, the current temperature becomes the new armed maximum temperature. At block 622, the idle workload controller updates the setback temperature 310 based on the updated armed maximum temperature. More particularly, in some examples, the setback temperature 310 is defined as the armed maximum temperature minus the target temperature delta 304 plus the setback temperature delta 312. Thereafter, control advances to block 624. Returning to block 618, if the current temperature is not greater than the armed maximum temperature, control advances directly to block 624.

At block 624, the example workload analyzer 410 determines whether any SWL is scheduled. If so, then no IWL is to be executed so as to not interfere with the performance of the processor 402 when executing the SWL. Accordingly, control advances to block 626 where the example temperature analyzer 412 determines whether the armed maximum temperature (set at block 620) minus the current temperature (obtained at block 602) satisfies (e.g., is greater than) a threshold. Block 626 serves to identify situations where large temperatures drops (e.g., exceeding the threshold) occur during an active period so as to not inadvertently cause the temperature of the processor 402 to increase during an idle period if it has already cooled during a preceding active period. Thus, if the threshold is satisfied (e.g., the difference between the armed maximum temperature and the current temperature exceeds the threshold), control advances to block 628 where the example idle workload controller 414 disarms the IWL procedure. Thereafter, control advances to block 636 to determine whether to continue the process as discussed above. If the example temperature analyzer 412 determines, at block 626, that the threshold is not satisfied, control advances directly to block 636 such that the IWL procedure remains armed.

Returning to block 624, if the example workload analyzer 410 determines that no SWL is scheduled, control advances to block 630 where the example temperature analyzer 412 determines whether the current temperature is lower than the setback temperature 310. In some examples, if reliability is more important than performance and the potential for large thermal fluctuations during active periods are to be avoided, blocks 622 and 624 may be omitted. In such examples, control advances from blocks 618 and 622 directly to block 630. If the example temperature analyzer 412 determines, at block 630, that the current temperature is not lower than the setback temperature 206, then no action needs to be taken so control advances directly to block 636. However, if the current temperature is lower than the setback temperature 310, control advances to block 632 where the example idle workload controller 414 selects an IWL from the example idle workload database 420. At block 634, the example idle workload controller 414 provides the IWL to the processor 402 for execution. Thereafter, control advances to block 636.

Returning to block 616, if the example idle workload controller 414 determines that the timeout period 208 has elapsed, control advances to block 628 where the example idle workload controller 414 disarms the IWL procedure. Thereafter, control advances to block 636 to determine whether to continue the process as discussed above. If so, control again returns to block 602. If not, the example process of FIG. 6 ends.

Figure 7:
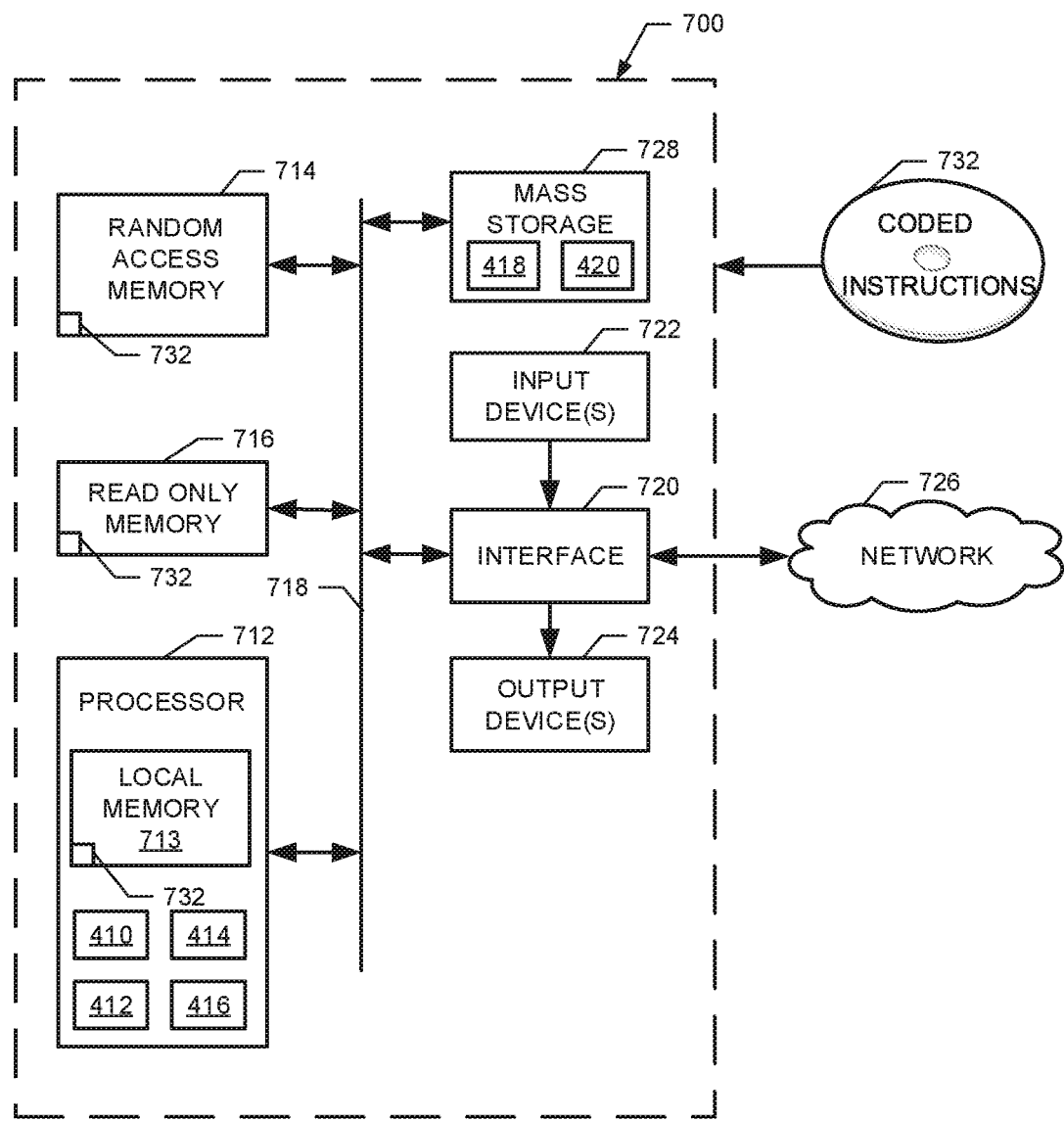
FIG. 7 is a block diagram of an example processing platform structured to execute the instructions of FIGS. 5 and 6 to implement the example thermal fluctuations controller of FIG. 4.

FIG. 7 is a block diagram of an example processor platform 700 structured to execute the instructions of FIGS. 5 and 6 to implement the thermal fluctuation controller 408 of FIG. 4. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example workload analyzer 410, the example temperature analyzer 412, the example idle workload controller 414, and the example timer 416.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In this example, the mass storage device implements the example memory 418, and/or the example idle workload database 420

The machine executable instructions 732 of FIGS. 5 and 6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that improve the reliability and/or useful life of a processor by reducing the frequency, number, and/or severity of large thermal fluctuations in the processor between active and idle periods of use. Furthermore, examples disclosed herein achieve this technological benefit without impacting the performance of the processor. The disclosed methods, apparatus and articles of manufacture are accordingly directed to one or more improvement(s) in the functioning of a computer.

Example 1 includes an apparatus comprising a temperature analyzer to determine a current temperature of a processor, and a controller to provide an idle workload to the processor to execute in response to the current temperature falling below a setback temperature Example 2 includes the apparatus of example 1, wherein the controller is to provide the idle workload to the processor when the processor is in an idle state and to not provide the idle workload to the processor when the processor is in an active state.

Example 3 includes the apparatus of example 2, further including a workload analyzer to determine whether the processor is in the idle state or the active state based on whether a standard workload is scheduled for execution by the processor.

Example 4 includes the apparatus of any one of examples 1-3, wherein the controller is to provide the idle workload to the processor when an idle workload procedure is armed and to not provide the idle workload to the processor when the idle workload procedure is disarmed.

Example 5 includes the apparatus of example 4, wherein the controller is to arm the idle workload procedure in response to the current temperature exceeding a threshold temperature.

Example 6 includes the apparatus of example 5, wherein the threshold temperature is defined by a fixed target temperature.

Example 7 includes the apparatus of example 5, wherein the threshold temperature is defined as a target temperature delta above a disarmed minimum temperature, the disarmed minimum temperature corresponding to a lowest value observed for the current temperature of the processor since the idle workload procedure was last disarmed.

Example 8 includes the apparatus of any one of examples 4-7, wherein the controller is to disarm the idle workload procedure in response to a timeout period elapsing since the idle workload procedure was last armed.

Example 9 includes the apparatus of any one of examples 4-7, wherein the controller is to disarm the idle workload procedure in response to an idle period of the processor exceeding a threshold time period.

Example 10 includes the apparatus of any one of examples 4-7, wherein the controller is to disarm the idle workload procedure in response to a difference between the current temperature and an armed maximum temperature exceeding a threshold, the armed maximum temperature corresponding to a highest value observed for the current temperature of the processor since the idle workload procedure was last armed.

Example 11 includes the apparatus of any one of examples 1-4, wherein the setback temperature is a fixed temperature delta higher than a target temperature.

Example 12 includes the apparatus of example 11, wherein the target temperature is defined by a fixed temperature value.

Example 13 includes the apparatus of example 11, wherein the target temperature is defined by a dynamic temperature value, the dynamic temperature value corresponding to a target temperature delta below an armed maximum temperature, the armed maximum temperature corresponding to a highest value observed for the current temperature of the processor during a relevant period of time.

Example 14 includes the apparatus of any one of examples 1-13, wherein execution of the idle workload serves no purpose other than to increase the current temperature of the processor.

Example 15 includes a non-transitory computer readable medium comprising instructions that, when executed, cause a machine to at least determine a current temperature of a processor, and provide an idle workload to the processor to execute in response to the current temperature falling below a setback temperature.

Example 16 includes the non-transitory computer readable medium of example 15, wherein instructions cause the machine to provide the idle workload to the processor when the processor is in an idle state and to not provide the idle workload to the processor when the processor is in an active state.

Example 17 includes the non-transitory computer readable medium of example 16, wherein instructions cause the machine to determine whether the processor is in the idle state or the active state based on whether a standard workload is scheduled for execution by the processor.

Example 18 includes the non-transitory computer readable medium of any one of examples 15-17, wherein instructions cause the machine to provide the idle workload to the processor when an idle workload procedure is armed and to not provide the idle workload to the processor when the idle workload procedure is disarmed.

Example 19 includes the non-transitory computer readable medium of example 18, wherein instructions cause the machine to arm the idle workload procedure in response to the current temperature exceeding a threshold temperature.

Example 20 includes the non-transitory computer readable medium of example 19, wherein the threshold temperature is defined by a fixed target temperature.

Example 21 includes the non-transitory computer readable medium of example 19, wherein the threshold temperature is defined as a target temperature delta above a disarmed minimum temperature, the disarmed minimum temperature corresponding to a lowest value observed for the current temperature of the processor since the idle workload procedure was last disarmed.

Example 22 includes the non-transitory computer readable medium of example 18, wherein instructions cause the machine to disarm the idle workload procedure in response to a timeout period elapsing since the idle workload procedure was last armed.

Example 23 includes the non-transitory computer readable medium of any one of examples 18-22, wherein instructions cause the machine to disarm the idle workload procedure in response to an idle period of the processor exceeding a threshold time period.

Example 24 includes the non-transitory computer readable medium of any one of examples 18-22, wherein instructions cause the machine to disarm the idle workload procedure in response to a difference between the current temperature and an armed maximum temperature exceeding a threshold, the armed maximum temperature corresponding to a highest value observed for the current temperature of the processor since the idle workload procedure was last armed.

Example 25 includes the non-transitory computer readable medium of any one of examples 15-19, wherein the setback temperature is a fixed temperature delta higher than a target temperature.

Example 26 includes the non-transitory computer readable medium of example 25, wherein the target temperature is defined by a fixed temperature value.

Example 27 includes the non-transitory computer readable medium of example 25, wherein the target temperature is defined by a dynamic temperature value, the dynamic temperature value corresponding to a target temperature delta below an armed maximum temperature, the armed maximum temperature corresponding to a highest value observed for the current temperature of the processor during a relevant period of time.

Example 28 includes the non-transitory computer readable medium of any one of examples 15-27, wherein the processor is a first processor, and the machine corresponds to a second processor different than the first processor.

Example 29 includes the non-transitory computer readable medium of any one of examples 15-27, wherein the machine corresponds to the processor.

Example 30 includes a method comprising measuring a current temperature of a processor, and causing the processor to execute an idle workload to generate heat in response to the current temperature falling below a setback temperature.

Example 31 includes the method of example 30, further including providing the idle workload to the processor when the processor is in an idle state, wherein the idle workload is not provided to the processor when the processor is in an active state.

Example 32 includes the method of example 31, further including determining whether the processor is in the idle state or the active state based on whether a standard workload is scheduled for execution by the processor.

Example 33 includes the method of any one of examples 30-32, wherein the idle workload is provided to the processor when an idle workload procedure is armed, and the idle workload is not provided to the processor when the idle workload procedure is disarmed.

Example 34 includes the method of example 33, further including arming the idle workload procedure in response to the current temperature exceeding a threshold temperature.

Example 35 includes the method of example 34, wherein the threshold temperature is defined by a fixed target temperature.

Example 36 includes the method of example 34, wherein the threshold temperature is defined as a target temperature delta above a disarmed minimum temperature, the disarmed minimum temperature corresponding to a lowest value observed for the current temperature of the processor since the idle workload procedure was last disarmed.

Example 37 includes the method of any one of examples 33-36, further including disarming the idle workload procedure in response to a timeout period elapsing since the idle workload procedure was last armed.

Example 38 includes the method of any one of examples 33-36, further including disarming the idle workload procedure in response to an idle period of the processor exceeding a threshold time period.

Example 39 includes the method of any one of examples 33-36, further including disarming the idle workload procedure in response to a difference between the current temperature and an armed maximum temperature exceeding a threshold, the armed maximum temperature corresponding to a highest value observed for the current temperature of the processor since the idle workload procedure was last armed.

Example 40 includes the method of any one of example 30-33, wherein the setback temperature is a fixed temperature delta higher than a target temperature.

Example 41 includes the method of example 40, wherein the target temperature is defined by a fixed temperature value.

Example 42 includes the method of example 40, wherein the target temperature is defined by a dynamic temperature value, the dynamic temperature value corresponding to a target temperature delta below an armed maximum temperature, the armed maximum temperature corresponding to a highest value observed for the current temperature of the processor during a relevant period of time.

Example 43 includes an apparatus comprising means for sensing a current temperature of a processor, and means for controlling an idle workload procedure, the controlling means to provide an idle workload to the processor to execute in response to the current temperature falling below a setback temperature.

Example 44 includes the apparatus of example 43, wherein the controlling means is to provide the idle workload to the processor when the processor is in an idle state and to not provide the idle workload to the processor when the processor is in an active state.

Example 45 includes the apparatus of example 44, further including means for analyzing a workload to determine whether the processor is in the idle state or the active state based on whether a standard workload is scheduled for execution by the processor.

Example 46 includes the apparatus of any one of examples 43-45, wherein the controlling means is to provide the idle workload to the processor when the idle workload procedure is armed and to not provide the idle workload to the processor when the idle workload procedure is disarmed.

Example 47 includes the apparatus of example 46, wherein the controlling means is to arm the idle workload procedure in response to the current temperature exceeding a threshold temperature.

Example 48 includes the apparatus of example 47, wherein the threshold temperature is defined by a fixed target temperature.

Example 49 includes the apparatus of example 47, wherein the threshold temperature is defined as a target temperature delta above a disarmed minimum temperature, the disarmed minimum temperature corresponding to a lowest value observed for the current temperature of the processor since the idle workload procedure was last disarmed.

Example 50 includes the apparatus of any one of examples 46-49, wherein the controlling means is to disarm the idle workload procedure in response to a timeout period elapsing since the idle workload procedure was last armed.

Example 51 includes the apparatus of any one of examples 46-49, wherein the controlling means is to disarm the idle workload procedure in response to an idle period of the processor exceeding a threshold time period.

Example 52 includes the apparatus of any one of example 46-40, wherein the controlling means is to disarm the idle workload procedure in response to a difference between the current temperature and an armed maximum temperature exceeding a threshold, the armed maximum temperature corresponding to a highest value observed for the current temperature of the processor since the idle workload procedure was last armed.

Example 53 includes the apparatus of any one of examples 43-46, wherein the setback temperature is a fixed temperature delta higher than a target temperature.

Example 54 includes the apparatus of example 53, wherein the target temperature is defined by a fixed temperature value, the apparatus of example 50, wherein the target temperature is defined by a dynamic temperature value, the dynamic temperature value corresponding to a target temperature delta below an armed maximum temperature, the armed maximum temperature corresponding to a highest value observed for the current temperature of the processor during a relevant period of time.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   memory;
   instructions; and
   programmable circuitry to execute the instructions to:
      determine a current temperature of a processor; and
      provide, in response to the current temperature falling below a setback temperature, an idle workload to the processor for execution, execution of the idle workload to cause the processor to heat up to maintain the processor above a threshold temperature, the setback temperature a fixed temperature delta higher than the threshold temperature.

2. The apparatus of claim 1, wherein the programmable circuitry is to provide the idle workload to the processor when the processor is in an idle state and to not provide the idle workload to the processor when the processor is in an active state.

3. The apparatus of claim 2, wherein the programmable circuitry is to determine whether the processor is in the idle state or the active state based on whether a standard workload is scheduled to be executed by the processor.

4. The apparatus of claim 1, wherein the programmable circuitry is to provide the idle workload to the processor when an idle workload procedure is armed and to not provide the idle workload to the processor when the idle workload procedure is disarmed.

5. The apparatus of claim 4, wherein the programmable circuitry is to arm the idle workload procedure in response to the current temperature exceeding the threshold temperature.

6. The apparatus of claim 5, wherein the threshold temperature is defined by a fixed target temperature.

7. The apparatus of claim 5, wherein the threshold temperature is defined as a target temperature delta above a disarmed minimum temperature, the disarmed minimum temperature corresponding to a lowest value observed for the current temperature of the processor since the idle workload procedure was last disarmed.

8. The apparatus of claim 4, wherein the programmable circuitry is to disarm the idle workload procedure in response to a timeout period elapsing since the idle workload procedure was last armed.

9. The apparatus of claim 4, wherein the programmable circuitry is to disarm the idle workload procedure in response to an idle period of the processor exceeding a threshold time period.

10. The apparatus of claim 4, wherein the programmable circuitry is to disarm the idle workload procedure in response to a difference between the current temperature and an armed maximum temperature exceeding a threshold, the armed maximum temperature corresponding to a highest value observed for the current temperature of the processor since the idle workload procedure was last armed.

11. The apparatus of claim 1, wherein the threshold temperature is defined by a fixed temperature value.

12. The apparatus of claim 1, wherein the threshold temperature is defined by a dynamic temperature value, the dynamic temperature value corresponding to a target temperature delta below an armed maximum temperature, the armed maximum temperature corresponding to a highest value observed for the current temperature of the processor during a relevant period of time.

13. The apparatus of claim 1, wherein execution of the idle workload serves no purpose other than to increase the current temperature of the processor.

14. A non-transitory computer readable medium comprising instructions to cause a machine to at least:
 determine a current temperature of a processor; and
 in response to the current temperature falling below a setback temperature when an idle workload procedure is armed, provide an idle workload to the processor for execution, execution of the idle workload to cause the processor to heat up to maintain the processor above a threshold temperature, the idle workload not to be provided to the processor when the idle workload procedure is disarmed regardless of the current temperature.

15. The non-transitory computer readable medium of claim 14, wherein the instructions cause the machine to provide the idle workload to the processor when the processor is in an idle state and to not provide the idle workload to the processor when the processor is in an active state.

16. The non-transitory computer readable medium of claim 14, wherein the instructions cause the machine to arm the idle workload procedure in response to the current temperature exceeding the threshold temperature.

17. The non-transitory computer readable medium of claim 14, wherein the instructions cause the machine to disarm the idle workload procedure in response to a timeout period elapsing since the idle workload procedure was last armed.

18. The non-transitory computer readable medium of claim 14, wherein the instructions cause the machine to disarm the idle workload procedure in response to an idle period of the processor exceeding a threshold time period.

19. The non-transitory computer readable medium of claim 14, wherein the processor is a first processor, and the machine corresponds to a second processor different than the first processor.

20. The non-transitory computer readable medium of claim 14, wherein the machine corresponds to the processor.

21. A method comprising:
 measuring a temperature of a processor;
 arming, by executing instructions with programmable circuitry, an idle workload procedure in response to the temperature reaching a target temperature; and
 in response to the temperature falling below a setback temperature while the idle workload procedure is armed, causing the processor to execute an idle workload to generate heat to maintain the temperature of the processor above the target temperature, the setback temperature higher than the target temperature.

22. The method of claim 21, further including providing the idle workload to the processor when the processor is in an idle state, wherein the idle workload is not provided to the processor when the processor is in an active state.

23. The method of claim 21, wherein the idle workload is not provided to the processor when the idle workload procedure is disarmed.

24. The method of claim 21, further including disarming the idle workload procedure a threshold period of time after arming the idle workload regardless of the temperature of the processor.

25. The non-transitory computer readable medium of claim 14, wherein the instructions cause the machine to define the setback temperature based on the threshold temperature, the setback temperature a fixed delta temperature higher than the threshold temperature.

* * * * *